Feb. 1, 1949.

G. L. LANG 2,460,511

AUTOMATIC RADIO SIGNALING MEANS
FOR AVIATION TRAINERS

Filed May 27, 1943

GREGOR L. LANG
INVENTOR.

BY Donald T. Hillier
Philip S. Hopkins
ATTORNEYS.

Feb. 1, 1949. G. L. LANG 2,460,511
AUTOMATIC RADIO SIGNALING MEANS
FOR AVIATION TRAINERS
Filed May 27, 1943 3 Sheets-Sheet 2
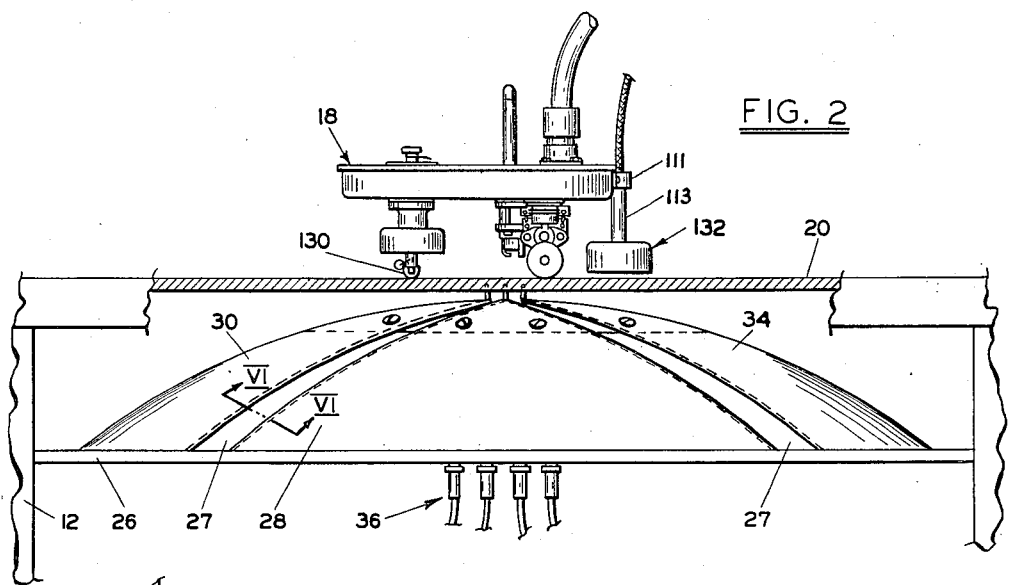
FIG. 2
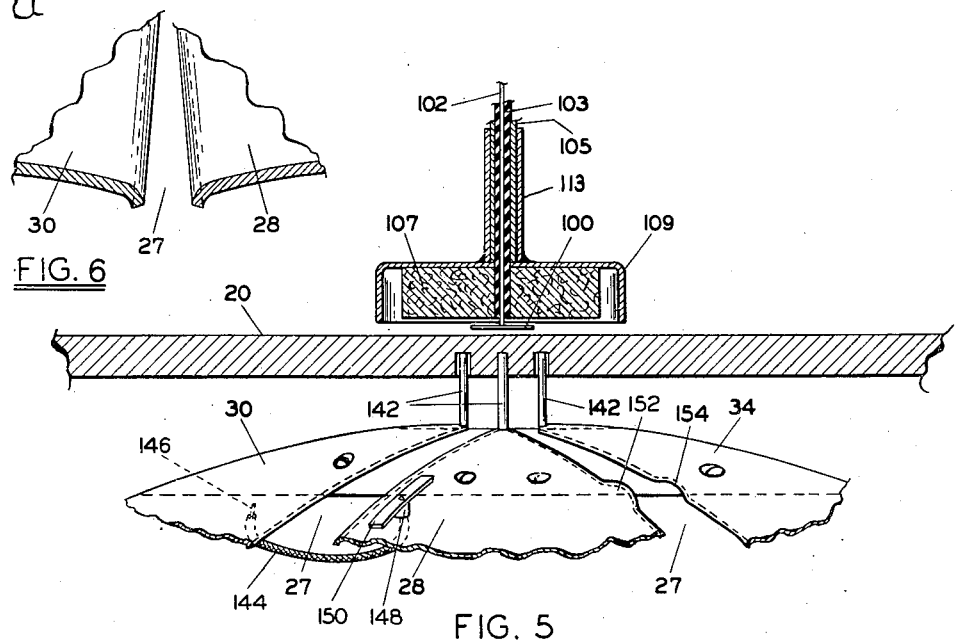
FIG. 6
FIG. 5
GREGOR L. LANG
INVENTOR.
BY
ATTORNEYS.

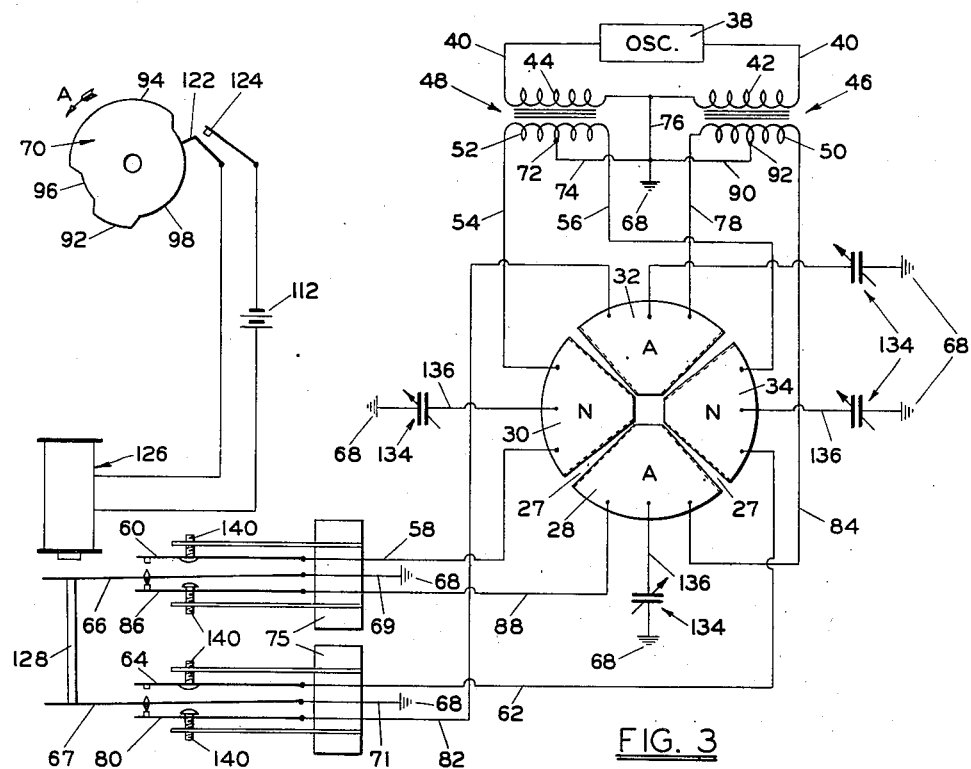

Patented Feb. 1, 1949

2,460,511

UNITED STATES PATENT OFFICE 2,460,511

AUTOMATIC RADIO SIGNALING MEANS FOR AVIATION TRAINERS

Gregor L. Lang, West Haven, Conn., assignor to Link Aviation, Inc., a corporation of New York Application May 27, 1943, Serial No. 488,659

3 Claims. (Cl. 35—10)

My invention relates to an aviation trainer, and particularly to means for training pilots in the art of navigation by radio.

Radio aids have proved to be of great and increasing value to the navigator. Among the most important of these radio aids are the signals sent out by those stations commonly referred to as radio range stations. Each radio range station transmits a pattern marking four courses, normally 90° apart, although this spacing is often varied in order that one or more of the courses will coincide with an established airway. This system utilizes generally two pairs of transmitting towers which transmit interlocking Morse code signals. For instance, one pair of towers may be transmitting directionally the letter A (. _) while the other pair transmits the letter N (_ .), the timing being synchronized so that at all times one pair of towers is transmitting a signal.

This arrangement produces the result that in any two diagonally opposite quadrants, as seen in Fig. 1, the A signal is heard clearly and the N signal is of a lesser intensity or is not heard at all, depending upon how far the plane is from an N quadrant. In the other pair of diagonally opposite quadrants, the relative intensities of the letters are reversed. Each quadrant slightly overlaps the neighboring ones and in the narrow wedge of about 3° that forms the center of the overlap, the A and N signals are heard with equal intensity so the dots and dashes of the two signals interlock to produce a continuous tone. This is the familarly "on-course" signal.

The navigator of a plane, by intercepting the signals being transmitted by such a radio range station will therefore be able to tell whether the plane is in an A quadrant, an N quadrant or on one of the "on-course" beams. By maneuvering the plane and noticing the effects of the maneuvers upon the intercepted signals the pilot is able to locate the position of the plane in the radiated field pattern of the radio range station and, inasmuch as he has in the plane with him a map of the emanated field pattern of the station, he can ascertain the geographical position of the ship. A concrete detailed example of exactly how this is accomplished is set forth in my copending application Serial No. 440,950, since matured into Patent No. 2,435,502, dated February 3, 1948.

In the instruction of students to fly by means of the signals transmitted by these radio range stations it has been found particularly desirable to combine with a trainer of the type disclosed in U. S. Patents 1,825,462 and 2,099,857, which trainers are commonly known as "Link trainers," means whereby simulated radio signals may be transmitted to the student in the trainer who, by interpreting the simulated signals received, "navigates" the trainer in the same manner that he would actually navigate a real plane by means of actual radio range signals.

It is common practice in the prior art to combine with such a trainer a recorder of the type disclosed in U. S. Patent 2,179,663, which recorder is placed upon a map of a real or imaginary radio range station signal field. This recorder responds directionally to the changes in the heading of the trainer so that it travels at all times over the map in the same direction as the trainer is assumed to be flying through the radio range signal field. The student in the trainer controls the direction of the trainer and, therefore, the direction of the recorder's travel, in response to the simulated radio range signals received by him, and the recorder traces the assumed track of the trainer through the assumed radio range signal field. The instructor in turn transmits signals to the student in the trainer in accordance with the observed position of the recorder upon the map, which position represents the assumed position of the trainer in an assumed radio range signal pattern.

Means under the manual control of the instructor whereby he can transmit A-N signals of varying relative intensities and of varying absolute intensities to the student in the trainer in accordance with the moving position of the recorder over the map are disclosed in my copending application Serial No. 440,950, as well as U. S. Patent 2,119,083. However, such a system has several disadvantages. First, such a system requires the constant close attention of the instructor. Secondly, the instructor at all times must estimate the desired relative intensities of the A-N signals as well as the proper absolute volume to be given these signals, and then he must manually set the controls in the positions which he believes will give the estimated desired signal intensities. In order that the constant attention of an experienced instructor may be dispensed with, and in order to eliminate the inevitable errors of judgment upon the part of the instructor, it is highly desirable that there be automatic means for changing the relative as well as absolute intensities of these A-N signals heard by the student in the trainer as the recorder changes its position upon the map. It is a principal object of my invention, as well as of my invention disclosed in my abandoned application Serial No. 483,431, filed April 17, 1943, to provide means which will replace the manual controls by which the instructor determines the relative as well as absolute A and N signals transmitted to the trainer by a fully automatic device which will transmit to the student signals more nearly simulating the signals which a plane would intercept if it were actually flying the flight that the trainer is assumed to be making.

It is a further object of my invention to provide such a means eliminating the use of radio frequencies. It is a complementary object of my invention to provide an automatic radio range comprising the use of audio frequencies only.

It is a further object of my invention to combine the foregoing objects with a range utilizing an electrostatic field of an alternating audio frequency current "keyed" in accordance with the conventional Morse code signals for the letters A and N.

It is still a further object of my invention to provide a miniature automatic radio range utilizing a plurality of metallic quadrants to form an electrostatic field of an alternating audio frequency current "keyed" in accordance with the conventional Morse code signals for the letters A and N.

It is another object of my invention to provide means whereby bent courses, multiple courses and other irregularities in the emanated field pattern of a radio range station may be simulated in an automatic radio range of the type provided by this invention.

The preferred embodiment of my invention is shown in the accompanying figures in which like reference numerals indicate like parts. In the figures, Fig. 1 is a general view showing the trainer, desk, map and recorder.

Fig. 2 is a front elevation of certain parts of my automatic radio range.

Figs. 3 and 4 show the electrical circuits of such a range.

Fig. 5 is a detailed view of the signal pickup means and associated parts.

Fig. 6 is a cross sectional view of two of the quadrants of my invention, taken on the line VI—VI of Fig. 2.

Figure 1:
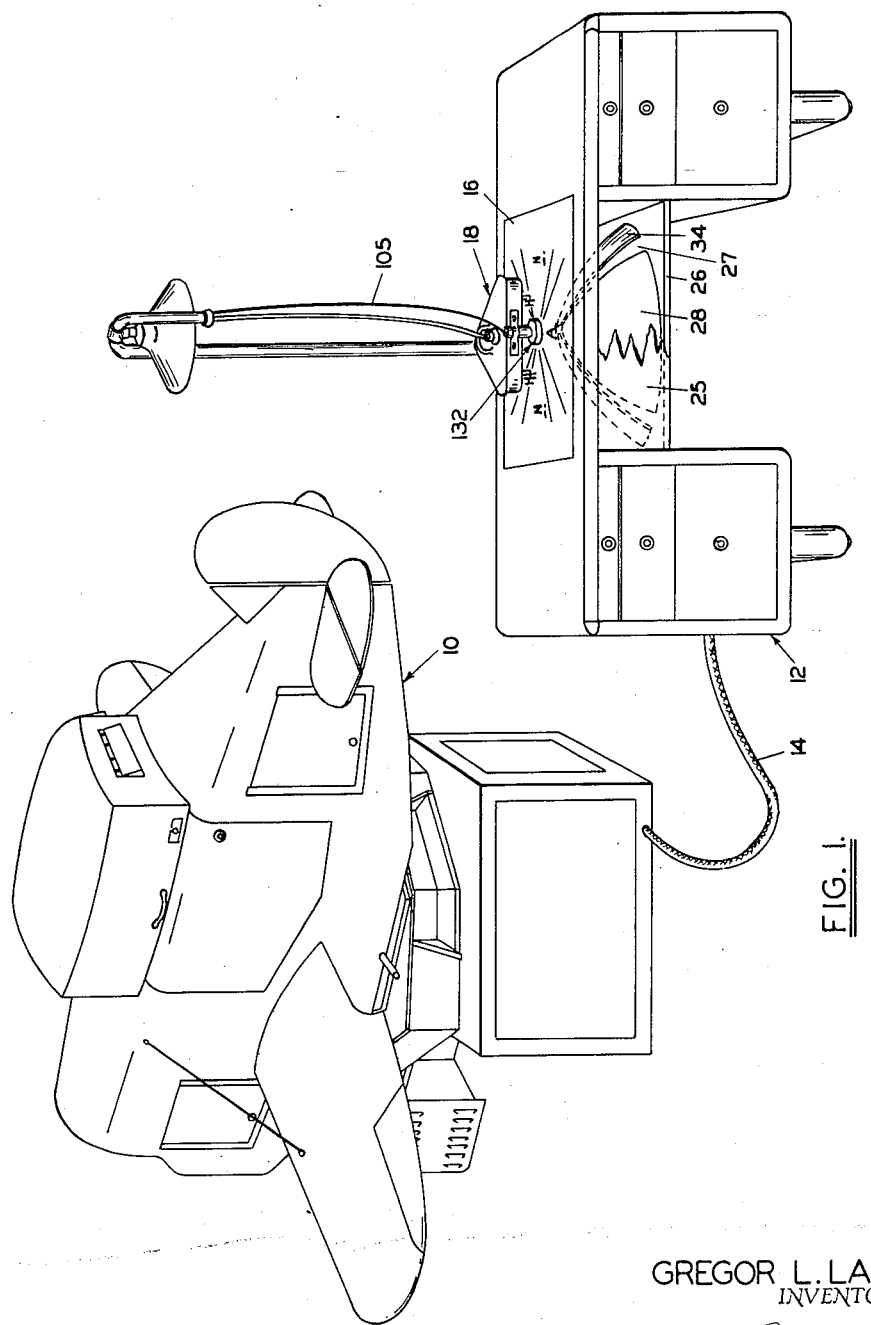

In Fig. 1, the numeral 10 designates a trainer of the type previously mentioned, and the trainer is electrically connected to the various parts located at the instructor's desk 12 by means of cable 14. Upon the desk 12 is map 16 which shows the radiated field pattern of a real or assumed radio range station, and placed upon the map is the recorder designated generally as 18. The functioning of this recorder has been previously described. Referring now to Fig. 2 it will be seen that the recorder 18 rests upon the top 20 of the desk and this top is preferably made of an insulating material such as wood, Bakelite, or glass. Map 16 is not shown in this view. Supporting member 26 is suitably attached to desk 12 and four quadrant-shaped sheets of metal 28, 30, 32 and 34 rest upon member 26 and are arranged to apparently form a large disc when seen from above as in Fig. 3. Only three of these quadrants 28, 30, and 34 are shown in Fig. 2. These quadrants are all insulated from one another as seen in Fig. 3 by wedge-shaped openings 27. These quadrants slope downwardly toward their peripheries, and the central part of each of these quadrants is closest to the table top 20. The edges of each of the quadrants along wedge openings 27 also slope downwardly, for purposes to be hereinafter explained. It will be seen that a plurality of cables designated generally in Fig. 2 by 36 are suspended below member 26. The function of these cables will also be later described. These quadrants form the stator electrodes and their spacing, form and relative positions determine the configuration of the resulting electrostatic space field, as will also be later understood.

Reference is now made to Fig. 3 which shows my preferred electrical system. As seen in this figure, there is provided an oscillator 38 which generates a 1020 cycle tone. This frequency is preferably used in my invention because the modulating frequency used by radio ranges are of this same frequency. By means of conductors 40 a 1020 cycle wave will be set up in the series connected primaries 42 and 44 of the transformers designated generally by 46 and 48. A similar tone will therefore be induced in the secondaries 50 and 52 of these transformers. Secondary 52 is connected by means of wire 54 to quadrant 30 and by means of conductor 56 to quadrant 34. Quadrant 30 in turn is connected by means of conductor 58 to flexible arm 60 while corresponding conductor 62 connects quadrant 34 and flexible arm 64. Flexible contact arms 66 and 67 are connected to ground 68 by means of conductors 69 and 71.

The quadrants 30 and 34, being connected to opposite ends of the same secondary, will be instantaneously charged at equal and opposite voltages. In other words, their voltages are 180° out of phase. If flexible arm 60 be out of contact with flexible arm 66, as shown in Fig. 3, quadrant 30 will be electrically charged, and if flexible arm 64 be out of contact with flexible arm 67, also as seen in Fig. 3, quadrant 34 also will be charged. Blocks 75 in which these flexible contact arms are mounted are non-conductors. Quadrant 30 will have the same polarity as the end of the secondary 52 to which it is connected and quadrant 34 will have the same polarity as the other end of secondary 52. Inasmuch as the polarity of this secondary changes in accordance with the frequency of signal source 38 the polarities of quadrants 30 and 34 will change at the same rate, in the event flexible arms 66 and 67 are positioned as shown in Fig. 3. A 1020 cycle voltage will therefore be induced in each of these quadrants. However, in the event that contact arm 60 be in contact with arm 66 quadrant 30 will not become charged because it is connected to ground 68 which, it is to be noticed, is connected to center tap 72 of secondary 52 by means of conductors 74 and 76, thereby completing the circuit. Also, if flexible arm 64 be in contact with flexible arm 67, quadrant 34 will not become charged for the same reason. Furthermore, when arm 66 contacts arm 60 and arm 67 contacts arm 64, quadrants 30 and 34 are shorted by means of conductor 128, and therefore, no charge is placed upon these quadrants. As will hereinafter be explained, the position of rotation of A-N cam 70 governs the making and breaking of the above-mentioned contacts and, therefore, also governs the charging of the quadrants 30 and 34.

Still referring to Fig. 3, it is to be noted that the left end of secondary 50 is connected to quadrant 32 by means of conductor 78 and this quadrant is connected to flexible arm 80 by means of conductor 82. Similarly, the right end of secondary 50 is connected to quadrant 28 by means of conductor 84 and this quadrant in turn is connected to flexible arm 86 by means of conductor 88. It will be readily understood that in the event flexible member 80 is in engagement with flexible arm 67, as shown in Fig. 3, no charge will be placed upon quadrant 32 because it is shorted to quadrant 28 and is connected to ground 68 and by means of conductors 76 and 90 to the center tap 92 of secondary 50. In the event flexible member 86 is in engagment with flexible arm 66, also as shown in Fig. 3, no charge will be placed upon quadrant 28. However, if contact 86 were out of engagement with arm 66, and contact 80 were out of engagement with arm 67, quadrants 28 and 32 would be charged in accordance with the polarities of the end of secondary 50 to which they are connected. Inasmuch as the polarity of secondary 50 changes 1020 times per second, it will be realized that whenever quadrants 28 and 32 are not grounded nor shorted the polarity of the charges placed thereupon will vary at the same rate.

From the foregoing, it will be realized that each of the secondaries 50 and 52 will charge the pair of quadrants connected to it with a 1020 cycle voltage if the quadrants are not grounded and shorted. Each of the quadrants acts as a stator electrode and sets up about it an electrostatic field having the same frequency as the oscillator 38.

A-N cam 70 is rotated in the direction of the arrow as seen in Fig. 3 by any suitable constant speed means such as a small motor (not shown). The periphery of this cam has a short elevated portion 92, a short depressed portion 96, a long elevated portion 94 and a depressed portion 98 of equal length. Whenever cam 70 is in a position of rotation such that follower 122 rides upon elevated portion 92, the circuit is made at the point 124 and relay 126 is energized. The energization of this relay attracts member 128 toward it and, therefore, flexible contacts 66 and 67 move in the same direction. As long as relay 126 remains energized, contact is made between flexible contacts 60 and 66 on the one hand and contacts 64 and 67 on the other. Therefore, quadrants 28 and 32 are not shorted nor grounded and they will be charged in accordance with the polarity of the end of the secondary 50 to which each is connected. For the length of time that this condition prevails quadrants 30 and 34 are not only grounded but are short circuited by means of member 128, and, therefore, they are at ground potential. Whenever follower 122 rests upon elevated portion 94, the same condition prevails.

However, in the event follower 122 is within depressed portions 96 or 98 relay 126 will not be energized and member 128 and consequently flexible contacts 66 and 67 will be in their normal positions as seen in Fig. 3. In such position, flexible member 66 is in contact with member 86 and flexible contact 67 is in contact with member 80. When this condition prevails, quadrants 28 and 32 will be grounded as well as short circuited, and, therefore, no charge will be placed thereupon. However, quadrants 30 and 34 will not be grounded and, therefore, will be charged in accordance with the polarity of the end of secondary 52 to which each is connected. Consequently, whenever follower 122 is in depressed portions 96 or 98, the polarity of quadrants 30 and 34 with respect to ground changes at the rate of 1020 times per second, but quadrants 28 and 32 are at ground potential. But for the period of time when follower 122 rests upon elevated portion 92 or 94 the polarity of quadrants 28 and 32 with respect to ground changes at the rate of 1020 cycles per second while quadrants 30 and 34 are at ground potential.

Whenever either pair of diagonally opposed quadrants is charged, which, as explained, depends upon the position in rotation of cam 72, an electrostatic field having the same frequency as signal source 38 is set up in the space adjacent the charged quadrants.

The Morse code signal for the letter A is a dot followed by a dash (. —) while the Morse code signal for the letter N is a dash followed by dot (— .). When cam 70 is rotated counterclockwise, as seen in Fig. 3, and follower 122 rests upon the elevated portion 92 of cam 70, quadrants 30 and 34 will be grounded as well as short circuited to each other and, therefore, not charged while quadrants 28 and 32 will not be grounded nor shorted and, therefore, will be charged. As the cam moves to such position that follower 122 is in the depression 96 the opposite condition will prevail, namely, quadrants 28 and 32 will be grounded as well as shorted to each other and, therefore, not charged while quadrants 30 and 34 will not be grounded nor shorted and, consequently, will be charged. As cam 70 rotates and follower 122 rests upon the elevated portion 94, quadrants 30 and 34 will be grounded and shorted while quadrants 28 and 32 will be charged. Finally, as cam 70 rotates and follower 122 is in depression 98, quadrants 28 and 32 will be grounded and shorted and quadrants 30 and 34 charged.

It will be realized, therefore, that the rotation of cam 70 causes quadrants 30 and 34 on the one hand and quadrants 28 and 32 on the other hand to become alternately charged positively and negatively for a period of time followed by a remaining at ground potential for a period of time. While one pair of quadrants is being alternately charged, the other pair is grounded and shorted and, therefore, at ground potential. Specifically, from the preceding discussion, it will be realized that quadrants 28 and 32 will be alternately charged for a short length of time, grounded and shorted for a short length of time, then charged for a longer length of time, followed by a grounding and shorting for a longer length of time, and then the cycle is repeated. Consequently, quadrants 28 and 32 are alternately charged in accordance with the Morse code signal pattern for the letter A (. —) and these two quadrants are therefore referred to as the A quadrants. It will also be realized from the preceding discussion that quadrants 30 and 34 will be alternately charged for a long length of time followed by a grounding and shorting for a short length of time and then will be alternately charged for a short period followed by a grounding and shorting for a long period. Therefore, inasmuch as these two quadrants are charged in accordance with the Morse code signal pattern for the letter N (— .) they are referred to as the N quadrants. The result realized, therefore, is that the electrostatic field set up by one pair of quadrants (28 and 32) is keyed in the Morse code pattern for the letter A, while the electrostatic field set up by the other pair is keyed in the Morse code pattern for the letter N.

Reference is again made to Fig. 2 which shows the recorder 18 and its inking wheel 130 which traces upon the map 16 the simulated track of the trainer's "flight." The signal pickup mechanism of my invention which is affixed to any suitable part of the recorder 18 is designated in that figure by 132. Reference is now made to Fig. 5 which shows the detailed arrangement of this part of the invention. In Fig. 5, it will be seen that the electrostatic pick up plate 100 is parallel with the top the desk 20 and that it is integrally connected with conductor 102. Suitable insulating material 103 surrounds this conductor and the insulated conductor is covered with metal shielding 105. A fiber washer 107 is placed above pickup plate 100 and metal shield cup 109 surrounds the washer and pickup plate and is connected to the shielding 105. Cup 109 is suitably supported from the recorder by means of bracket 111 and tube 113 formed integrally with cup 109. The recorder 18, metal shield cup 109 and metal shielding 105 are grounded. Cup 109 and shielding 105 confine the effective capacitive pickup elements to electrode 100.

Reference is now made to Fig. 4 which shows the capacitive pickup plate or receiving electrode 100 and the conductor 102 which is connected to the control grid 104 of amplifier designated generally by 106. Variable resistance 105 is inserted between pickup electrode 100 and grid 104 and grid 104 and ground 68. The plate 110 is connected to the direct current power supply 112 and the primary 114 of a transformer 116 is in series with the plate circuit. Secondary 118 of this transformer is in series with earphones 120.

As the recorder 18 traces the simulated flight of the trainer 10 over the map 16 of the radio range station, as seen in Fig. 1, the pickup electrode 100 will change its position with respect to the A and N quadrants which are under the top 20 of the desk. It will be recalled that the N quadrants 30 and 34 are alternately charged by the 1020 cycle wave in the pattern of the Morse code signal for the letter N (— .). When recorder 18 is positioned so that pickup mechanism 132, which includes pickup electrode 100, is in either of the keyed electrostatic fields set up by these quadrants, a signal will be impressed upon electrode 100 by the electrostatic signal field and will be transferred by means of conductor 102 to control grid 104. The bias of this grid will therefore be varied at the frequency of the electrostatic field. The changing bias of control grid 104 in turn will change the plate current of amplifier 106 in the usual manner at the same frequency, and in the N pattern, and by means of transformer 116 and N signal will be heard in the earphones 120.

When the recorder 18 and pickup electrode 100 is over one of the A quadrants 28 or 32, by virtue of corresponding functioning, the Morse code signal for the letter A will be heard in the earphones 120.

Assuming that pickup electrode 100 is above the bisector of one of the N quadrants and, therefore, in the bisector of the electrostatic field set up by that quadrant, the electrostatic fields set up by the A quadrants will not affect grid 104, and consequently, a pure N signal will be heard by the student, but as the recorder moves in a direction to carry pickup electrode 100 into the electrostatic field set up by the A quadrants, the A signal will begin to be heard but the N signal will be the louder. If the pickup electrode 100 goes closer to the area above the A quadrants, the intensity of the A signal heard becomes greater until, when the pickup electrode is above one of the wedges 27, the A and N signals will merge into a continuous tone, in simulation of the "on-course" note intercepted by a plane in actual flight. (In order that this note may be continuous, the switches in Fig. 3 operated by relay 126 should be of the make-before-break type. Screws 140 are there provided in order that exact timing of these switches may be accomplished.) Should the pickup electrode 100 be carried by the recorder 18 to the area above one of the A quadrants, the A signal would be heard louder by the student while the N signal will be of lesser intensity, and when the electrode 100 is completely out of the area of influence of the fields set up by the N quadrants, the A signal only will be heard. It will, therefore, be realized that the relative intensities of the A and N signals heard by the student using earphones 120 are automatically varied as the recorder 18 carrying electrode 100 moves over the map 16 of the radio range station, in simulation of the varying of the relative intensities of the A and N signals as a plane in actual flight flies through the radiated field pattern of a radio range station.

In actual flight through a radio range signal pattern not only do the relative intensities of the A and N signals vary, depending upon whether the plane is in an A or an N quadrant, but the absolute volume of these signals increases as the plane approaches the transmitting station. In order that this phenomena may be simulated by my invention, the A and N quadrants, as seen in Figs. 1, 2 and 5 slope downwardly from their centers so that their outer portions are farther from the top 20 of the desk 12. It will therefore be realized that when the recorder 18 is positioned upon the map 16 so that the pickup electrode 100 is at a point far removed from the center of the quadrants, the electrostatic field in which the pickup electrode 100 will be placed will be relatively weaker because electrode 100 is a greater distance from the quadrants, the bias of grid 104 will not be affected to such a great extent and, therefore, the intensities of the signals heard will be less. As the recorder moves so that pickup electrode 100 moves toward the simulated transmitting tower, the pickup electrode 100 moves closer to the A and N quadrants and, therefore, is in a stronger electrostatic field and the intensities of the signals heard will increase. In other words, the actual distance between pickup electrode 100 and any of the quadrants determines the effective capacity of the pickup plate and the quadrant, the smaller the distance the higher the capacity. The value of this capacity determines the amplitude of the signal transferred to the grid 104 by that quadrant, thereby controlling the volume of the signal heard in the earphones as a result of the electrode 100 being in the electrostatic field set up by that quadrant.

As a plane in actual flight through a radio range signal pattern approaches the station from a distance, a gradual increase in the intensity of the intercepted signals is observed until the plane is a short distance from the transmitting towers. When this point is reached, a sudden and greatly increased intensity of the intercepted signals occurs and immediately thereafter for a short distance no signal is intercepted. This area of no signal reception is known as the cone of silence. As the ship continues over the station, upon leaving the margin of the cone of silence the extremely high level signal is again encountered. Continued travel outward from the cone of silence results in a rapid attenuation of signal level, in a manner inverse to that experienced upon approaching the cone. As seen in Fig. 5 there is attached to each of the quadrant plates at or close to their inner points a piece of wire or rod 142 which projects upward through the table top so as to nearly touch the pickup electrode 100 as it passes over them. This results in a stronger electrostatic field in the area above these pieces 142 and, therefore, when pickup electrode 100 is in this increased field an intensified signal in simulation of the intensified signal received in actual flight as the plane approaches the transmitting towers is received by the student in the trainer. When the pickup electrode 100 is directly above the center of the quadrants the effects of the opposite polarities or phase opposition of the two charged quadrants cancel each other and no signal is intercepted, in simulation of the cone of silence. The arrangement of pieces 142 has the added advantage of giving a sharply defined signal cancellation zone in simulation of the cone of silence. Therefore, my invention provides means for simulating the build-up of signals and the cone of silence which are intercepted as a plane flies over the transmitting station in actual flight.

As a plane in actual flight gets relatively close to the equi-signal zones between the A and N quadrants of a real radio range signal field, the absolute intensities of the signals decrease somewhat, even though the distance from the transmitting station is no greater. In order that this effect may be simulated in my invention, as stated earlier in the description, the edges of the quardants along wedge openings 27 slope downwardly, as seen in Fig. 6. The strength of the electrostatic fields through which pickup electrode 100 passes above the areas 27 will be weaker and, therefore, grid 104 will not have such a strong signal impressed thereon for a given distance from the center of the quadrants, and the signals heard in earphones 118 will be correspondingly less intense.

From the foregoing it will be seen that by means of my invention the absolute intensities of simulated radio range signals may be automatically varied with changes in the assumed position of the trainer in an assumed radio range signal field, in close simulation of the varying of signals intercepted by a real plane flying through a real radio range field pattern.

The signal intensities of signals intercepted can be modified by changing the slope of the quadrant plates and any real radio range may be simulated by changing the relative sizes of any of the four quadrants.

As seen in Fig. 3, a variable condenser 134 is connected by means of conductor 136 to quadrant 34 and the other side of this condenser is connected to ground 68. This arrangement, which is also employed in connection with each of the other quadrants, makes it possible to vary the amount of charge placed upon any of the quadrants. As the charge upon any quadrant is increased or decreased by a manipulation of these variable condensers, the strength of the electrostatic field set up by the quadrant also increases or decreases, and the signal heard by the student in the trainer will be correspondingly increased or decreased. It is therefore possible by means of these condensers to vary the relative intensities of the signals picked up from any quadrant, thereby causing a shift of the four wedge-shaped areas above the quadrants where the A and N signals are heard with equal intensity. In other words the simulated on-course beams may be shifted. This arrangement is advantageous because it makes possible the simulation of many different real radio ranges without a physical changing of the A and N quadrants. The same result could be realized by changing the actual shape of the quadrants.

Generally, real radio ranges set up signal patterns as previously described, but in certain parts of the country multiple courses are found, that is, the equi-signal zone, which is normally about 3° in width, is broken up into more than one on-course band. Fig. 5 discloses means for simulating this feature of the real radio ranges, and as seen in that figure, a shielded cable 144 is attached to quadrant 30 at the point 146 which is on the lower side of quadrant 30. This shielded cable runs below quadrant 30, below the wedge-shaped opening separating quadrant 30 and quadrant 28, below quadrant 28 and up through an insulating plug 148. Metallic member 150 is held in separation from quadrant 28 by means of insulating plug 148 and points toward the center of the quadrants as shown. Inasmuch as metallic member 150 is connected to quadrant 30, it will be realized that it will set up an electrostatic field synchronized with the field set up by quadrant 30. Quadrant 30, it will be recalled, is an N quadrant and inasmuch as quadrant 28 is an A quadrant, an N electrostatic field will be set up in the midst of the A electrostatic field set up by quadrant 28. When the recorder is above member 150, both the electrostatic field set up by member 150 and the electrostatic field set up by quadrant 28 will be picked up by electrode 100 and, therefore, the student in the trainer will intercept the on-course signal. To either side of member 150, however, the A signal from quadrant 28 will predominate. Inasmuch as the on-course signal intercepted when electrode 100 is above the wedge-shaped opening 27 is not affected by the presence of shielded cable 144 and member 150, it will be realized that two equi-signal zones are present, thereby simulating the multiple courses which occur in real radio ranges.

Another difficulty encountered in actual flight is that of the bent equi-signal zones. This phenomenon of actual flight may be simulated in my invention by changing the shapes of the quadrants. As seen in Fig. 5, quadrant 28 has an integral extension 152 while a corresponding portion 154 of quadrant 34 is cut away. It will be readily understood that this arrangement will cause a bend in the equi-signal zone above quadrants 28 and 34.

The previously-mentioned variable resistance 105 shown in Fig. 4 is under the control of the student using earphones 120 and a turning of the volume control of the radio receiver affects the volume of the signals heard in earphones 120 in the usual manner.

A reference to Fig. 2 will show that the inking wheel 130 of the recorder and the pickup electrode 100 are not coincident but are a certain distance apart. The position of the inking wheel upon the map designates the exact simulated position of the trainer. Inasmuch as the pickup electrode is separated from the inking wheel it is clear that the map of the simulated radio range and the quadrant plates must be displaced by an amount equal to the distance between the inking wheel and pickup electrode 100. Otherwise the signals intercepted will not correspond with the position of the inking wheel on the map. By placing the pickup electrode 100 exactly above the center of the four quadrant plates and arranging the map so that each of the on-course beams marked thereupon are parallel to the wedge-shaped openings between the quadrant plates, the inking wheel 130 of the recorder being placed upon the intersecting point of the on-course beams, as outlined on the map, the map and quadrant plates will be correctly oriented. This relationship having been established, the recorder will be correctly placed at any point upon the map if a line drawn through the inking wheel 130 and the center of the pickup electrode 100 is parallel to a line drawn through the center of the map and the center of the quadrant plates. This orientation having been made, regardless of the movements of the recorder 18 over the map 16, the inking wheel 130 will always be positioned with respect to the map 16 exactly as the pickup electrode 100 is positioned with respect to the quadrant plates. Therefore, the signals intercepted by the student in the trainer will be in accordance with the simulated position of the trainer as determined by the position of the inking wheel upon the map.

It will therefore be realized that by means of the aforedescribed invention, as the recorder moves over the map 16 of the radio range station the A and N signals heard by the student in the trainer will be automatically varied in simulation of the varying of the real signals intercepted by a navigator if the plane were making the actual flight being simulated by the apparatus herein described. All of the mentioned as well as other objects of the invention are accomplished by the invention.

The foregoing being but a preferred embodiment of my invention, and inasmuch as numerous changes may be made in the construction thereof without departing from the spirit, I limit myself only by the following claims.

I claim:

1. In a device for teaching aircraft navigation or the like by means of radio range signals, means for simulating the phenomenon of "multiple courses" of actual radio ranges, said means comprising two pairs of metallic sectors shaped and positioned relative to one another like the quadrants of a real radio range station, means for charging each pair of said metallic sectors in different predetermined code patterns simulating the code pattern of the signal field of a real radio range, an additional metallic member insulated from and placed adjacent the face of a selected one of said sectors, and an electrical connection between said additional metallic member and one of said sectors charged in a different code pattern from the selected sector.

2. In a device for teaching aircraft navigation or the like by means of radio range signals, means for simulating the phenomenon of "multiple courses" of actual radio ranges, said means comprising two pairs of metallic sectors shaped and positioned relative to one another like the quadrants of a real radio range station, means for charging each pair of said metallic sectors in different predetermined code patterns simulating the code pattern of the signal field of a real radio range, an additional metallic member insulated from and placed adjacent the face and near the edge of a selected one of said sectors, and an electrical connection between said additional metallic member and one of said sectors charged in a different code pattern from the selected sector.

3. In a device for teaching aircraft navigation or the like by means of radio range signals, means for simulating the phenomenon of "bent equi-signal zones," said means comprising two pairs of metallic sectors shaped and positioned relative to one another like the quadrants of a real radio range station, a portion of one edge of one of said sectors protruding toward the adjacent edge of an adjacent sector which in turn is formed generally complementary to said protrusion, and means for charging each pair of said metallic sectors in different predetermined code patterns simulating the code pattern of the signal field of a real radio range.

GREGOR L. LANG.

REFERENCES CITED

The following references are of record in the file of this patent:

UNITED STATES PATENTS

| Number | Name | Date |
|---|---|---|
| 887,357 | Stubblefield | May 12, 1908 |
| 1,610,692 | Logwood | Dec. 14, 1926 |
| 1,825,462 | Link | Sept. 29, 1931 |
| 2,064,640 | Bossart | Dec. 15, 1936 |
| 2,099,857 | Link | Nov. 23, 1937 |
| 2,110,869 | Crane | Mar. 15, 1938 |
| 2,119,083 | Link | May 31, 1938 |
| 2,179,663 | Link | Nov. 14, 1939 |
| 2,326,764 | Crane | Aug. 17, 1943 |